US007009386B2

(12) United States Patent
Tromblee et al.

(10) Patent No.: US 7,009,386 B2
(45) Date of Patent: Mar. 7, 2006

(54) NON-CONTACT POSITION SENSOR UTILIZING MULTIPLE SENSOR ELEMENTS

(75) Inventors: Gerald Tromblee, Hanover, MA (US); Kayvan Hedayat, Weston, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 171 days.

(21) Appl. No.: 10/038,747

(22) Filed: Jan. 2, 2002

(65) Prior Publication Data

US 2003/0169033 A1 Sep. 11, 2003

(51) Int. Cl.
*G01B 7/14* (2006.01)

(52) U.S. Cl. ............................ 324/207.2; 324/207.24; 324/207.25

(58) Field of Classification Search ............ 324/207.2, 324/207.21, 207.23, 207.24, 207.25, 207.26, 324/252, 251; 338/32 R, 32 H
See application file for complete search history.

(56) References Cited

U.S. PATENT DOCUMENTS 3,465,131 A * 9/1969 Eyck .......................... 235/450
4,667,514 A 5/1987 Baer ........................... 73/386
5,029,304 A * 7/1991 Tolmie, Jr. ................... 341/15
5,356,399 A * 10/1994 Takahashi ................... 604/339
5,398,185 A 3/1995 Omura ....................... 364/424
5,413,378 A 5/1995 Steffens, Jr. et al. ........ 280/735
5,459,399 A 10/1995 Durand et al. ........... 324/207.2
5,530,345 A * 6/1996 Murari et al. ............ 324/207.2
5,781,005 A 7/1998 Vig et al. ................ 324/207.2
5,793,200 A * 8/1998 Berrill ..................... 324/207.2
5,893,582 A 4/1999 Allen et al. ................. 280/735
6,053,529 A 4/2000 Frusti et al. ................ 280/735
6,095,555 A 8/2000 Becker et al. .............. 280/735
6,163,125 A * 12/2000 Bernauer et al. ........... 318/626
6,262,647 B1 * 7/2001 Rogers et al. .............. 335/206
RE37,466 E 12/2001 Allen et al. ................. 280/735
6,351,994 B1 3/2002 Pinkos et al. ................. 73/432
6,424,928 B1 * 7/2002 Elliott et al. ................ 702/151
6,561,544 B1 5/2003 Clancy, III et al. ......... 280/735
6,573,623 B1 6/2003 Tsuboi et al. ................. 310/12
6,593,735 B1 7/2003 Becker ....................... 324/207
6,612,404 B1 * 9/2003 Sweet et al. ................ 187/395
6,683,544 B1 1/2004 Tokunaga et al. ............. 341/15
2003/0060997 A1 3/2003 Ilyes .......................... 702/127

OTHER PUBLICATIONS

International Preliminary Examination Report received for corresponding PCT application No. PCT/US02/41903, Date of Mailing—Mar. 31, 2005 (6 pgs).

* cited by examiner

*Primary Examiner*—Jay Patidar
(74) *Attorney, Agent, or Firm*—Grossman, Tucker, Perreault & Pfleger, PLLC

(57) ABSTRACT

A non-contact position sensor including a plurality of sensor elements configured in an array. Each of the sensor elements is configured to provide an output associated with each of a plurality of positions of a sensor control element relative to the position sensor, whereby a separate combination of the outputs is provided for each of the positions. In one embodiment, the sensor elements may be Hall effect sensors, and the sensor control element may be a magnet. In another embodiment, the sensor elements may be Hall effect sensors and the sensor control element may be a shunt for blocking a magnetic field the Hall effect sensors. A vehicle seat position sensor system and a method of sensing vehicle seat position are also provided.

12 Claims, 14 Drawing Sheets

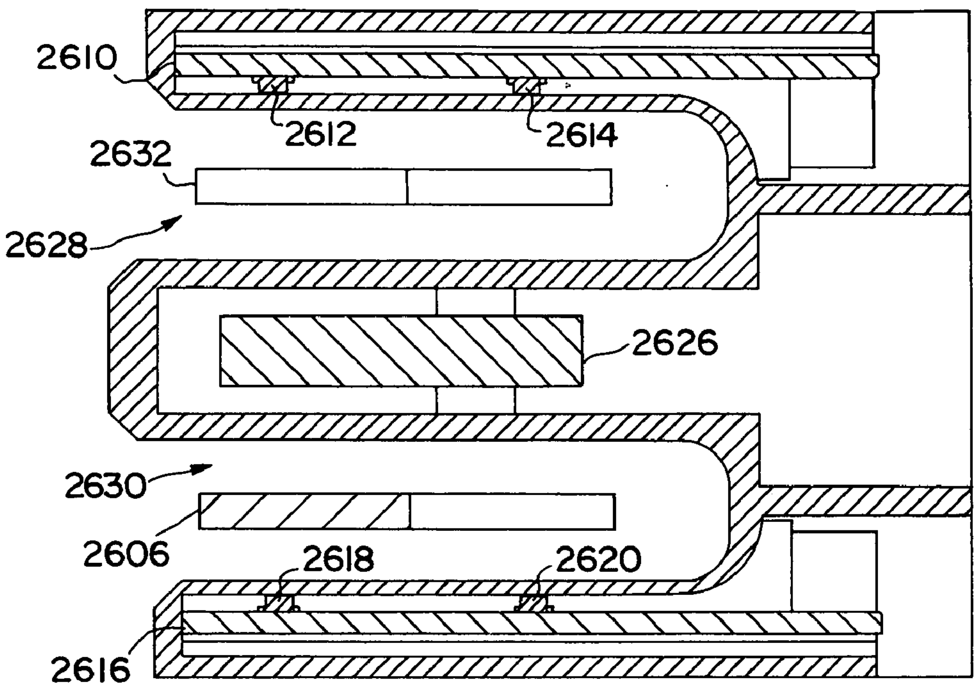
FIG. 27
FIG. 28A
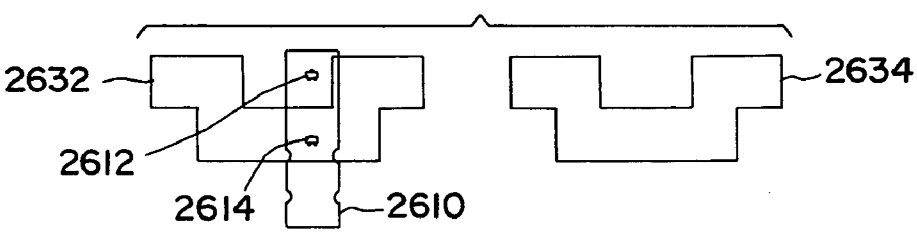
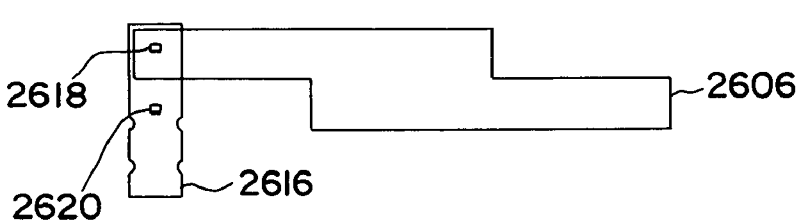
FIG. 28B

NON-CONTACT POSITION SENSOR UTILIZING MULTIPLE SENSOR ELEMENTS

FIELD OF THE INVENTION

The present invention relates in general to position sensors, and, more particularly, to non-contact positions sensors for sensing the position of a movable item such as an automobile seat.

BACKGROUND OF THE INVENTION

In a wide variety of applications it is advantageous or necessary to sense the position of a linearly or rotationally movable element. For example, in automobile seat applications the seat may be linearly movable, either manually or automatically via electro-mechanical means, on an associated track assembly. A sensor may provide a signal representative of the linear position of the seat on the track for a variety of purposes, e.g. to control deployment of an air bag, to control the electro-mechanical actuator that causes translation of the seat in connection with a seat position memory feature, etc.

For a seat position application, it is increasingly desirable for a sensor to provide multiple position outputs for purposes of ascertaining occupant position. For example, in applications where seat position is used to control air bag deployment early configurations involved only single stage air bag systems. A single stage air bag deploys with a known deployment force that may not be varied. In this application, seat position information was used only to determine when the airbag should be deployed. However, the advent of dual stage air bags, i.e. air bags that may be deployed with two distinct deployment forces, required increased resolution in position sensing. Also, the industry is now moving to variable stage airbags where the deployment force may be varied depending upon occupant position and classification. Variable stage airbag configurations will require a sensor that can detect multiple seat positions for use in determining the appropriate deployment force.

Also, a sensor may be configured to provide absolute position sensing or incremental position sensing. Generally, an absolute position sensor provides an output unique to a particular position, whereas an incremental sensor involves a reference point against which the output is compared. Absolute position sensing is typically more reliable than incremental sensing since, for example, loss of system power may require an incremental sensor to be reset to its reference and an errors in an incremental sensor may accumulate over time leading to an inaccurate position reading.

Another desirable feature of a position sensor, especially in the context of an automobile seat application, is that it be non-contact. A non-contact sensor has a sensing element that does not physically contact the sensed object. It is also advantageous that the sensor be mechanically decoupled from the seat track in an automobile seat application. These features allow quiet operation of the sensor and minimize wear, which could cause deterioration of performance.

Non-contact position sensors, however, typically include magnetic elements that attract ferrous particles introduced into the location near the sensor. For example, a coin or other object may fall into the location of the sensor and prevent accurate position sensing by magnetically attaching to the sensor magnet. Another difficulty associated with seat position sensors is that the seat track environment is very crowed. Also the space available for the sensor may vary from among vehicle types. The size and packaging of the sensor should, therefore, be flexible to allow use in a variety of vehicle types. In addition, it would be advantageous to have a menu of sensor configurations to allow selective use of an appropriate configuration depending on the track environment.

Accordingly, there is a need for a non-contact position sensor that provides accurate and reliable position sensing for a rotationally or linearly movable object.

SUMMARY OF THE INVENTION

According to one aspect of the invention, there is provided a non-contact position sensor including a plurality of sensor elements configured in an array. Each of the sensor elements is configured to provide an output associated with each of a plurality of positions of a sensor control element relative to the position sensor, whereby a separate combination of the outputs is provided for each of the positions. In one embodiment, the sensor elements may be Hall effect sensors, and the sensor control element may be a magnet. In another embodiment, the sensor elements may be Hall effect sensors and the sensor control element may be a shunt for blocking a magnetic field from the Hall effect sensors. A vehicle seat position sensor system consistent with the invention includes a position sensor consistent with the invention.

One method of sensing the position of a vehicle seat consistent the invention includes: providing a magnet; providing a position sensor comprising a plurality of Hall effect sensors configured in an array; each the Hall effect sensor configured to provide an output associated with each of a plurality of positions of the magnet relative to the position sensor, whereby a separate combination of the outputs is provided for each of the positions; mounting the position sensor and the magnet in the vehicle for relative non-contacting movement therebetween with movement of the seat; and determining the vehicle seat position in response to the separate combinations of outputs. Another method of sensing the position of a vehicle seat consistent the invention includes: providing a magnet; providing a position sensor comprising a plurality of Hall effect sensors configured in an array; each of the Hall effect sensors configured to provide an associated output in response to a magnetic filed of the magnet; providing a shunt configured to block the magnetic field from a plurality of combinations of the Hall effect sensors, each of the combinations being associated with a different position of the shunt relative to the magnet, whereby the outputs are collectively representative of an associated one of the positions; mounting the position sensor in fixed relation to the magnet in the vehicle for non-contacting relative movement between the shunt and the sensor and the magnet with movement of the seat; and determining the vehicle seat position in response to the outputs.

BRIEF DESCRIPTION OF THE DRAWING

For a better understanding of the present invention, together with other objects, features and advantages, reference should be made to the following detailed description which should be read in conjunction with the following figures wherein like numerals represent like parts:

FIG. 27: is a sectional view of the sensor system illustrated in FIG. 26; and FIGS. 28A–28B: diagrammatically illustrate a position of the shunt configurations to the sensor arrays in the system illustrated in FIG. 26.

DETAILED DESCRIPTION

For ease of explanation, sensors systems consistent with the invention will be described herein in connection with an automobile seat position sensing application. It will be recognized, however, that sensor systems consistent with the invention will be useful in other applications. In addition, the exemplary embodiments described herein include use of Hall effect sensors and magnets and/or shunts. Those skilled in the art will recognize, however, that a variety of sensing means may be used. For example, optical, magneto-resistive, fluxgate sensors, etc. may be useful in connection with a sensor system consistent with the invention. In alternative embodiments sensor control elements other than magnets or shunts, e.g. an optical source, may be used. It is to be understood, therefore, that illustrated exemplary embodiments described herein are provided only by way of illustration, and are not intended to be limiting.

Figure 1:
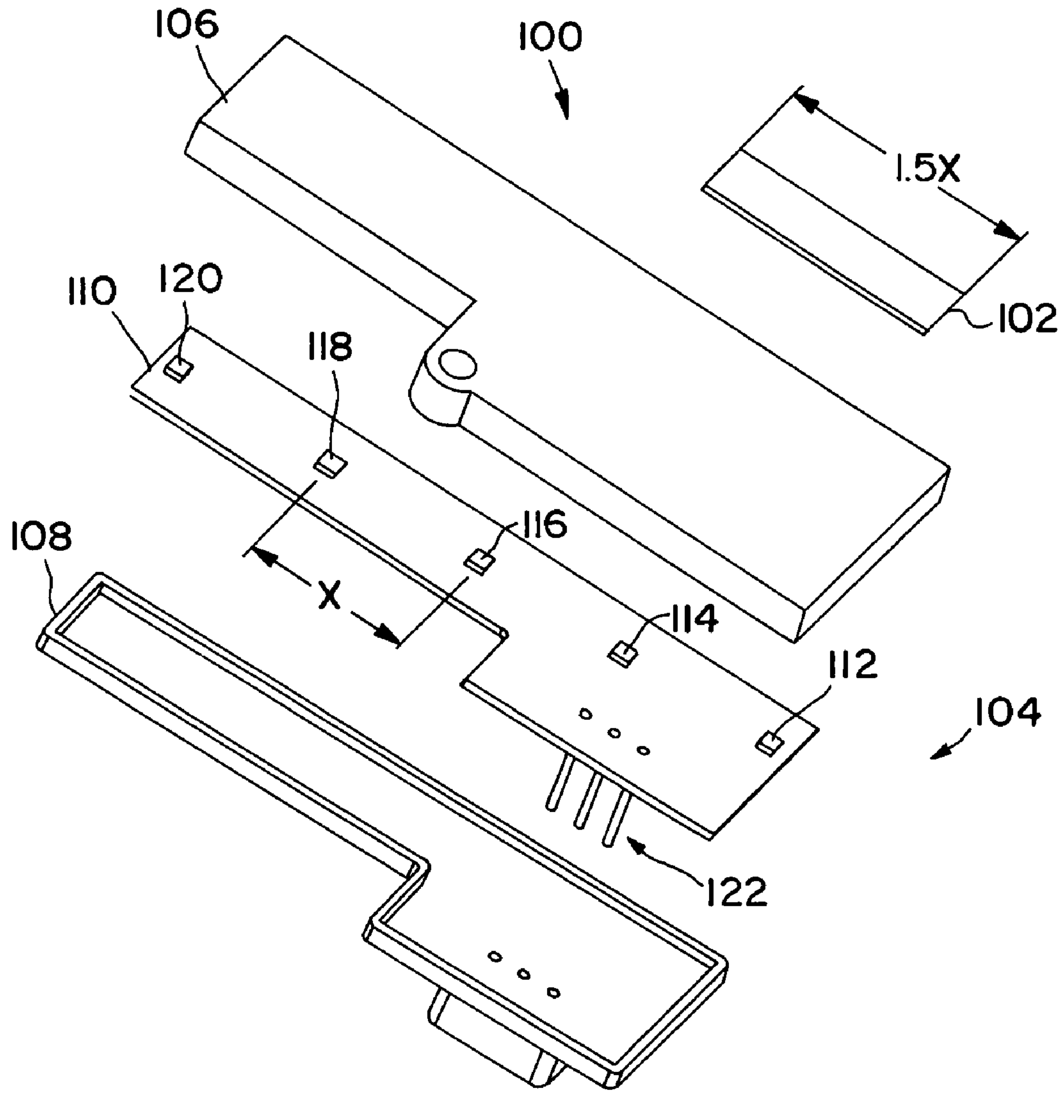
FIG. 1: is an exploded view of an exemplary sensor system consistent with the invention.

Turning to FIG. 1, there is illustrated in exploded view one exemplary embodiment of a sensor system 100 consistent with the invention. The illustrated system generally includes a magnet 102 and a sensor assembly 104. As shown in the sectional view of FIG. 2, the magnet 102 may be coupled to, for example, a movable portion 200 of an automobile seat track assembly and the sensor 104 may be positioned in close proximity to the magnet 102, e.g. on a stationary portion 202 of the seat track assembly or on the vehicle floor. Those skilled in the art will recognize that the orientation of the magnet 102 and the sensor 104 may be modified so that the sensor is on the movable element and the magnet is on a stationary element. Also, in some applications the sensor and magnet may both be applied to moveable elements to sense relative motion therebetween.

Figure 2:
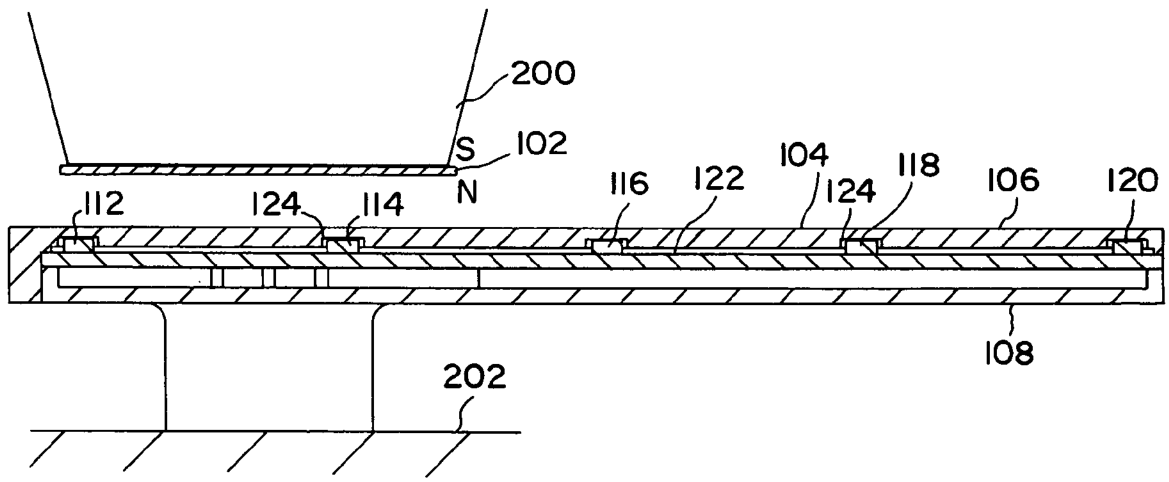
FIG. 2: is a sectional view of the sensor system illustrated in FIG. 1 showing mounting of the system to in a seat position sensing application.

In the illustrated exemplary embodiment, the sensor assembly 104 includes top 106 and bottom 108 housing portions and a circuit board 110. Five separate Hall effect sensors 112, 114, 116, 118, 120 are disposed on the circuit board 110 in a linear array. Outputs from the Hall sensors are accessible at pins 122 extending from the circuit board and through a bottom portion 108 of the housing. With reference to FIG. 2, the circuit board may be disposed in a cavity 122 defined between the top and bottom housing portions to prevent contaminants from disrupting operation of the Hall effect sensors. As shown, the Hall sensors may extend from the board into associated slots 124 formed in the top portion 106 of the housing so that the sensors are in close proximity to the top surface of the housing top portion for sensing a magnetic field proximate thereto.

In operation, position sensing is generally achieved by monitoring the outputs of the Hall effect sensors. As is known, a digital Hall effect sensor may be configured to provide a digital “1” output when in the presence of a predetermined level of magnetic flux, and to output a digital "0" when the predetermined level of flux is absent. As the magnet 102 travels linearly relative to the sensor 104, i.e. along or parallel to the array of Hall effect sensors, the magnetic field associated therewith causes the Hall sensors in the presence of the predetermined level of flux to output a digital "1." By monitoring which Hall sensors are providing a digital "1" output and which are providing a digital "0" output the absolute position of the magnet, which corresponds the absolute position seat or movable element to which the magnet is attached, may be determined.

Figure 3A:
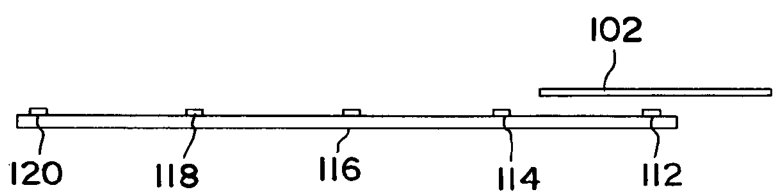
FIGS. 3A–B: diagrammatically illustrate separate positions of the magnet to the sensor array in the system illustrated in FIG. 1.
Figure 3B:
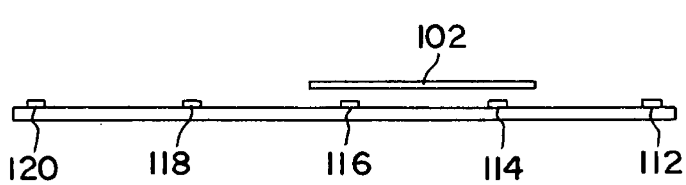

For example, FIGS. 3A and 3B diagrammatically illustrate separate positions of the magnet 102 relative to the Hall sensors, and Table 1 below illustrates the Hall outputs for each of nine separate positions available in the illustrated exemplary embodiment. The magnet position illustrated in FIG. 3A corresponds to position 1 on Table 1, and the magnet position illustrated in FIG. 3B corresponds to position 4 on Table 1. As shown, in position 1 the first Hall effect sensor 112 outputs a digital "1," while the other sensors output a digital "0." In position 4, only the second 114 and third 116 Hall effect sensors output a digital "1." FIG. 2 illustrates position 2, wherein the magnet 102 is disposed over the first 112 and second 114 Hall sensors, which output a digital "1" while the others output a digital "0."

TABLE 1

| Position | Hall 112 | Hall 114 | Hall 116 | Hall 118 | Hall 120 |
|---|---|---|---|---|---|
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 0 | 0 | 1 | 0 | 0 |
| 6 | 0 | 0 | 1 | 1 | 0 |
| 7 | 0 | 0 | 0 | 1 | 0 |
| 8 | 0 | 0 | 0 | 1 | 1 |
| 9 | 0 | 0 | 0 | 0 | 1 |

The Hall outputs thus identify the absolute position of the magnet 102 and the movable element to which it is mounted. Those skilled in the art will recognize that the resolution of a system consistent with the invention, i.e. the number of sensed positions, will depend on the number of Hall sensors and the length of the magnet. For example, the system illustrated in FIGS. 1 and 2 includes a magnet 102 having a length allowing it to extend over two adjacent Hall effect sensors, allowing nine positions to be sensed with five Hall sensors.

A system consistent with the invention may have any number of Hall sensors and a magnet configured to extend over any number of the sensors. For example, in the embodiment of FIG. 1, the magnet 102 may be modified to extend over three Hall effect sensors at one time. This embodiment would allow sensing of seven positions with Hall effect sensor outputs as indicated in Table 2 below.

TABLE 2

| Position | Hall 112 | Hall 114 | Hall 116 | Hall 118 | Hall 120 |
|---|---|---|---|---|---|
| 1 | 1 | 1 | 0 | 0 | 0 |
| 2 | 1 | 1 | 1 | 0 | 0 |
| 3 | 0 | 1 | 1 | 0 | 0 |
| 4 | 0 | 1 | 1 | 1 | 0 |
| 5 | 0 | 0 | 1 | 1 | 0 |
| 6 | 0 | 0 | 1 | 1 | 1 |
| 7 | 0 | 0 | 0 | 1 | 1 |

Although a system consistent with the invention may include a magnet extending over only one sensor, providing a magnet that extends over multiple sensors at one time may provide useful redundancy. For example, if one of the sensors fails, or its output is interrupted, logical combinations of the sensor outputs may be used to determine position of the magnet if the other sensors are operating. Providing redundancy in this manner offers system reliability in harsh environments, such as in an automotive application. Of course, redundancy may be of less concern in a particular embodiment than the issue of available space. A sensor system consistent with the invention, however, allows modification of the magnet length and sensor assembly length to meet any size requirements while providing reliable, absolute, and non-contact position sensing.

Figure 4:
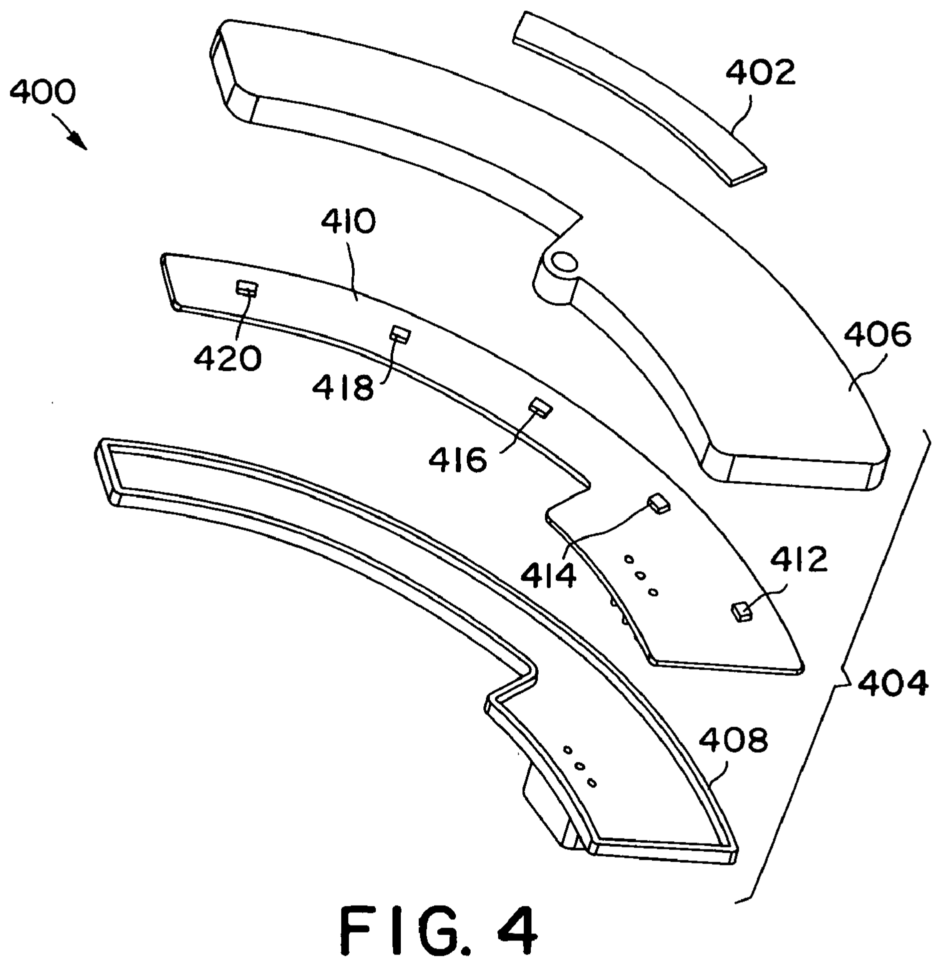
FIG. 4: is an exploded view of another exemplary sensor system consistent with the invention.
Figure 5:
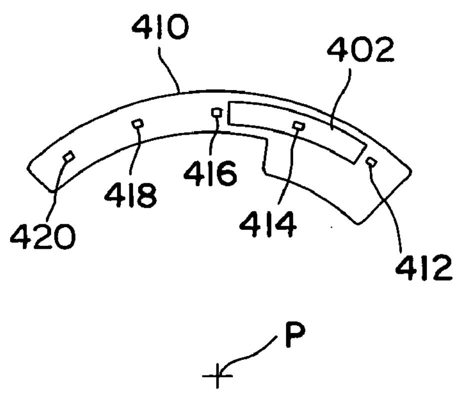
FIG. 5: diagrammatically illustrates a position of the magnet to the sensor array in the system illustrated in FIG. 4.

In another embodiment 400, as illustrated for example in FIGS. 4 and 5, the magnet 402 and the sensor assembly 404 may each be configured with a generally arcuate shape to facilitate sensing of rotational movement, i.e. angular position. In the illustrated exemplary embodiment, the sensor assembly 404 includes top 406 and bottom 408 arcuate housing portions for receiving an arcuate circuit board 410. The circuit board includes Hall effect sensors 412, 414, 416, 418, 420 disposed thereon in an arcuate array. In one embodiment, the sensor assembly 404 may be secured to a fixed position, and the magnet 402 may be secured to a rotationally movable element so that the magnet has an axis of rotation about a point P. The angular position of the magnet, and hence the movable element, is indicated by the outputs of the Hall devices 412, 414, 416, 418, 420. Table 3 illustrates nine angular positions associated with the exemplary system 400. The position of the Hall devices 412, 414, 416, 418, 420 relative to the magnet illustrated in FIG. 5 corresponds to position 3 on Table 3.

TABLE 3

| Angular Position | Hall 412 | Hall 414 | Hall 416 | Hall 418 | Hall 420 |
|---|---|---|---|---|---|
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 0 | 0 | 1 | 0 | 0 |
| 6 | 0 | 0 | 1 | 1 | 0 |
| 7 | 0 | 0 | 0 | 1 | 0 |
| 8 | 0 | 0 | 0 | 1 | 1 |
| 9 | 0 | 0 | 0 | 0 | 1 |

As with the linear sensor embodiments described above, the number of angular positions, i.e. the resolution, of the system 500, may be modified by changing the length of the magnet 502 and/or the number of Hall sensors.

Figure 6:
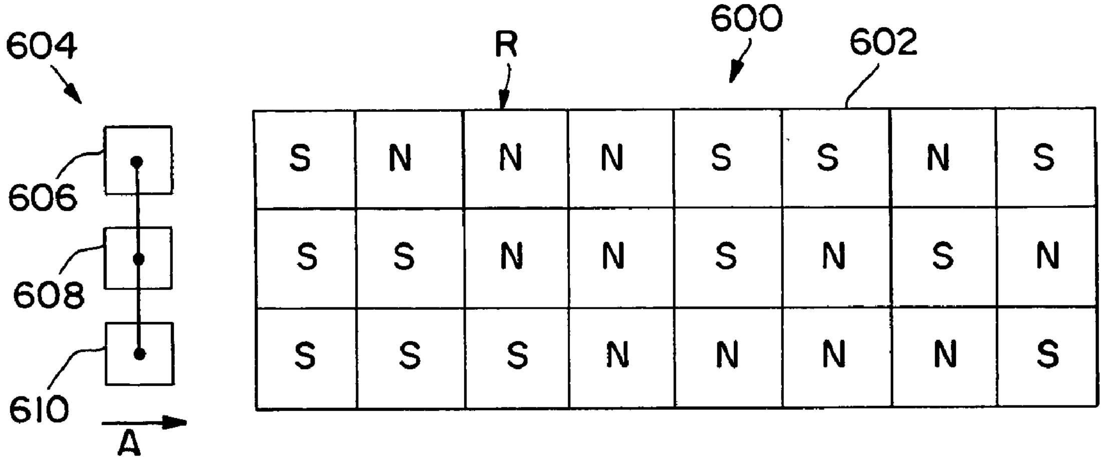
FIG. 6: diagrammatically illustrates another embodiment of a sensor system consistent with the invention.

In another exemplary system 600 consistent with the invention, a magnet 602 portion of the system may be "coded" with selected North and South magnet regions to control the Hall sensor outputs. As shown diagrammatically in FIG. 6, for example, the magnet 602 may include discreet North and South polarity portions indicated by "N" and "S", respectively. The North and South portions of the magnet 602 may be implemented by forming the magnet in separate pieces, i.e. by combining separate North and South polarized magnets to form a desired polarity pattern for the magnet. The magnet may also be formed as a unitary structure by separately magnetizing regions thereof with North and South polarities.

A linear array of sensors 604 may be configured so that relative movement of the magnet to the array is in a direction across or perpendicular to the array, e.g. in the direction of arrow A. Of course, the magnet 602 may move relative to the sensor array 604 or the magnet and array can each move relative to the other. The position of the sensor array relative to the magnet determines the output state of each sensor 606, 608, 610 in the array. Thus, for example, when the array is positioned over row R, the first 606 and second 608 sensors may output digital "1"s as a result of being in proximity to North polarized sections, whereas the third sensor 610 may output a digital "0" as a result of being in proximity to a South polarized section. In the illustrated exemplary embodiment, use of three sensors 606, 608, 610 allows eight distinct states or positions.

The size and the number of states or positions for a particular system may be modified by adding or removing sensors in the array and modifying corresponding magnet sections. Additional sensors may also be added to provide redundancy. For example, an additional sensor array may be provided in the system 600 to follow one or more rows ahead or behind the array 604. The outputs from the sensors of both arrays would determine position.

Figure 7:
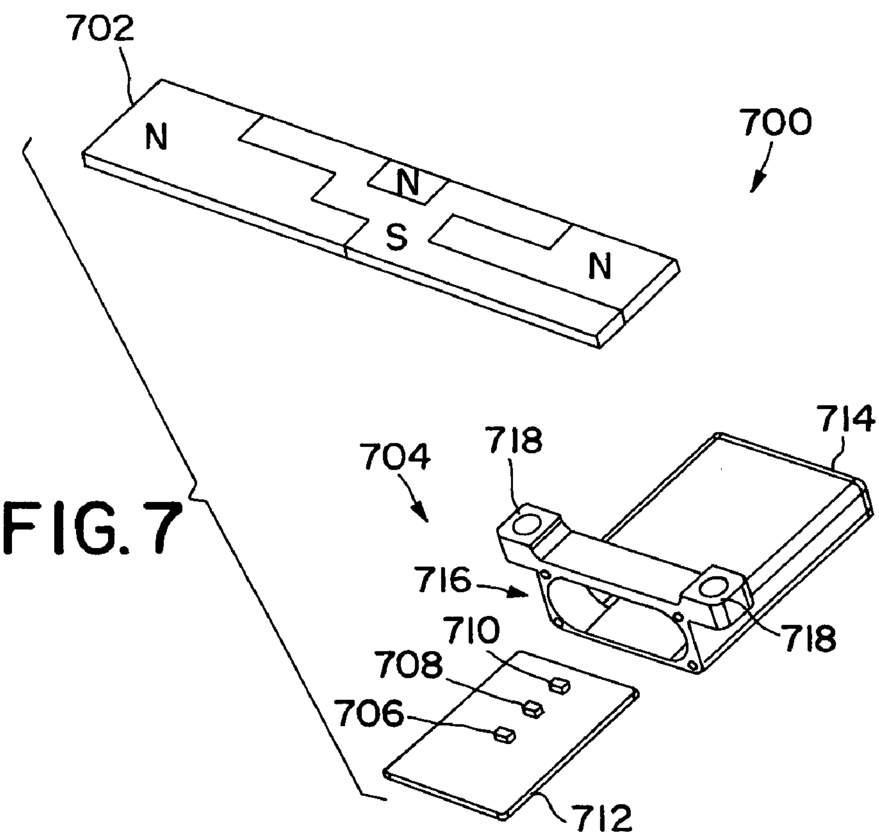
FIG. 7: is an exploded view of another exemplary sensor system consistent with the invention.

Turning now to FIG. 7, there is illustrated another exemplary embodiment of a sensor system 700 with a coded magnet. The illustrated embodiment includes a magnet 702 having unitary construction that that is selectively magnetized with North and South regions. The magnet 702 may, however, be formed as separate North and South pieces that are combined. A sensor assembly portion 704 of the system includes a plurality of Hall effect sensors 706, 708, 710 arranged in a linear array on a circuit board 712 and disposed in a housing 714. As shown also in FIG. 8, the housing includes an open end 716 for receiving the board 712 and mounting features 718 for mounting the housing in proximity to the magnet 702 as the magnet and/or the housing travel linearly.

Figure 9:
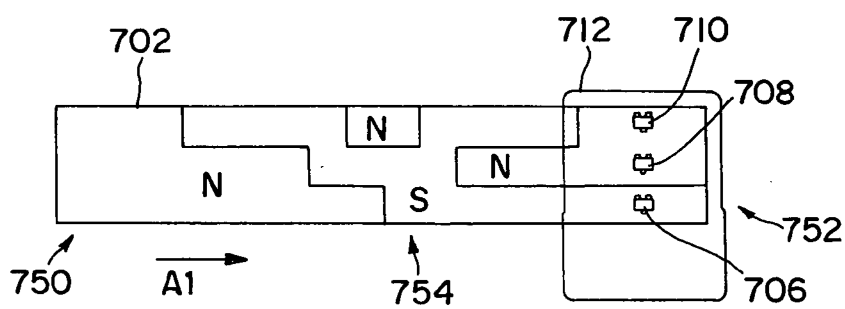
FIG. 9: diagrammatically illustrates a position of the magnet to the sensor array in the system illustrated in FIG. 7.

In the system 700 the housing and magnet are mounted so that relative movement of the magnet to the housing is in a direction generally perpendicular to the linear array of sensors 706, 708, 710. FIG. 9, for example, illustrates the relationship of the magnet 702 to the Hall sensors 706, 708, 710 in the exemplary system 700. In an embodiment wherein the magnet is mounted to a movable element such as a seat, the magnet may move in the direction of arrow A1 with the sensor remaining stationary.

As the magnet moves relative to the sensor array, each sensor 706, 708, 710 in the array senses a magnetic state dependent on the configuration of the magnet. In the illustrated exemplary embodiment, the magnet 702 determines outputs of the Hall sensors to allow sensing of eight separate positions on an absolute basis. The Hall sensor outputs for the system 700 for each of the eight positions are illustrated below in Table 4. The position illustrated in FIG. 9 corresponds to position 1 on Table 4.

TABLE 4

| Position | Hall 706 | Hall 708 | Hall 710 |
|---|---|---|---|
| 1 | 0 | 1 | 1 |
| 2 | 0 | 1 | 0 |
| 3 | 0 | 0 | 0 |
| 4 | 0 | 0 | 1 |
| 5 | 1 | 0 | 1 |
| 6 | 1 | 0 | 0 |

TABLE 4-continued

| Position | Hall 706 | Hall 708 | Hall 710 |
|---|---|---|---|
| 7 | 1 | 1 | 0 |
| 8 | 1 | 1 | 1 |

Figure 9A:
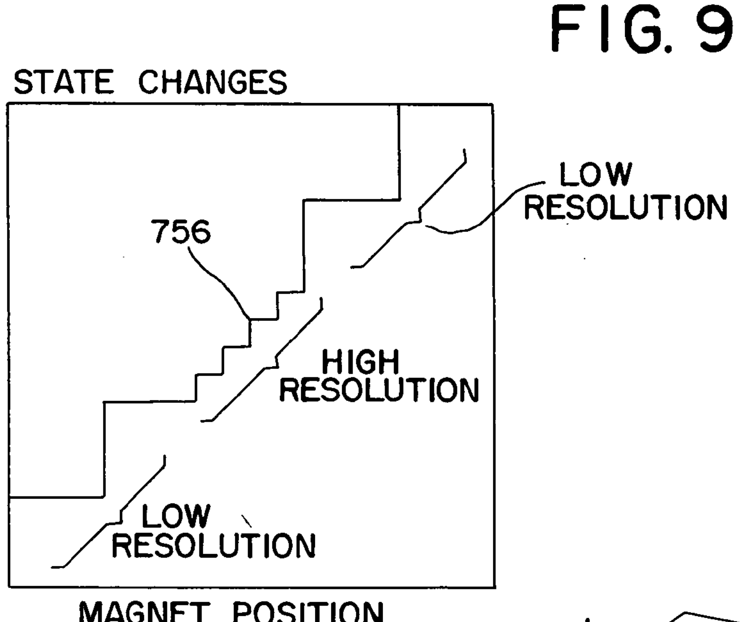
FIG. 9A: diagrammatically illustrates resolution of the system illustrated in FIG. 7 relative to the length of the magnet.

Advantageously, the number and arrangement of the sensed positions may be modified to meet the requirements of a particular application by simply changing the configuration of the magnetization states on the magnet and/or by modifying the magnet length. In the illustrated exemplary embodiment, the magnet 502 provides varying resolution along its length. FIG. 9A, for example, includes a plot 756 diagrammatically illustrating Hall state changes (indicated by steps) vs. magnet position associated with movement of the sensors from a first end 750 of the magnet to a second end 752 of the magnet. Each state change represents an absolute position sensed by the system. As shown, the magnet 702 provides a region of low resolution at each end 750,752 thereof and a region of higher resolution in the middle section 754 of the magnet. In particular, in the low resolution regions only two state changes occur, while in the high resolution region four state changes occur. This is accomplished by providing more frequent magnetic state changes in the middle section 754. Varying resolution depending on position may be useful, for example, in connection with seat position sensing associated with control of variable airbag systems.

Another advantage of a coded magnet embodiment consistent with the invention is that a coded magnet may be configured to reduce hysteresis effects of Hall effect sensors. Those skilled in the art will recognize that in most commercially available Hall effect sensors there is some hysteresis associated with transitions between output levels for the sensors. For example, the sensor may turn "on" to provide a digital "1" output at a one level of magnetic flux, but may turn "off" to provide a digital "0" when the magnetic flux decreases below the level at which the sensor turned on. A coded magnet configuration wherein magnetic states or polarities transition from North to South or South to North, as shown for example in FIGS. 4 and 5, causes commercially available Hall sensors to operate with sharp transitions between output states. This reduces the effects of hysteresis and ensures that the sensors turn on and off to provide accurate position sensing.

Figure 10A:
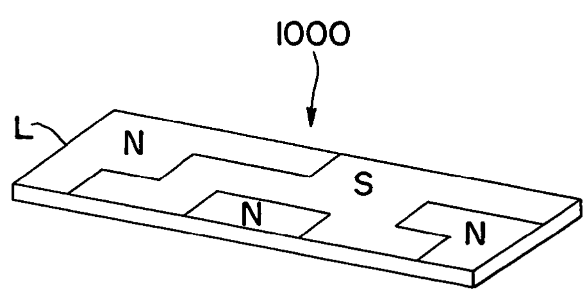
FIG. 10A: is a perspective view of a coded magnet consistent with the invention.
Figure 10B:
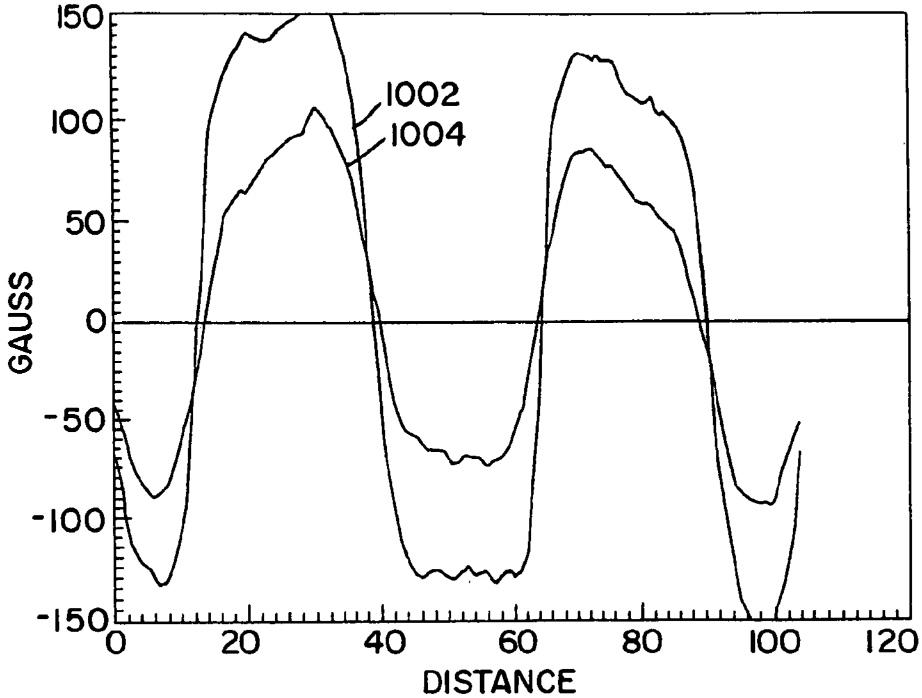
FIG. 10B: is plot of gauss vs. distance for an exemplary sensor traveling along line L in FIG. 10A at air gaps of 6 mm and 4 mm.

The effect of providing North-South transitions in a coded magnet consistent with the invention is illustrated in FIGS. 10A–10B in connection with a magnet embodiment 1000 including separate North and South components combined to form the magnet. Plots 1002 and 1004 in FIG. 10B provide an exemplary illustration of magnetic flux vs. distance sensed at a Hall sensor traveling along line L in FIG. 10A with the Hall sensor at 6 mm and 4 mm from the magnet, respectively. As shown, the transition from North to South magnetic states along the length of the magnet includes a change of more than 150 Gauss at the North state to about −135 Gauss in the South state.

Figure 10C:
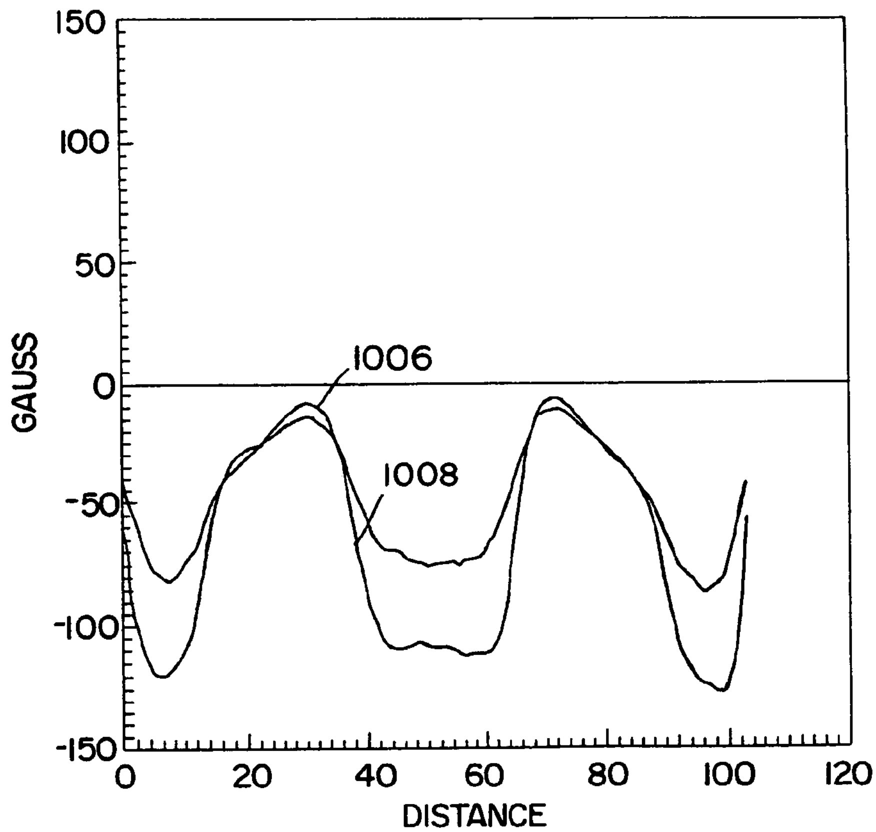
FIG. 10C: is plot of gauss vs. distance for an exemplary sensor traveling along line L in FIG. 10A at air gaps of 6 mm and 4 mm with the South regions removed from the illustrated magnet.

In contrast, plots 1006 and 1008 in FIG. 10C provide an exemplary illustration of magnetic flux vs. distance sensed at a Hall sensor positioned a 6 mm and 4 mm, respectively, from the magnet and traveling along line L in FIG. 10A when the North regions are removed from the magnet, leaving only the South regions. As shown, the transition from a South magnetic state to an open location (i.e. a location previously occupied by a North region) along the length of the magnet includes a change of only about −10 Gauss when the magnet is not at the South state to about −120 Gauss when the magnet is at the South state. The wide variation between magnetic field intensity in North and South states for a magnet including both North and South regions thus ensures that the Hall sensor adjacent the magnet switches on and off in a more reliable manner than when only a South region is provided.

Figure 11:
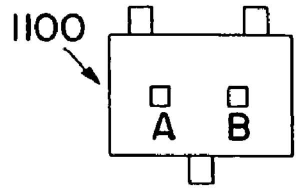
FIG. 11: is a top view of an exemplary Hall effect sensor having first and second switches.

Redundancy may also be provided in a configuration with a coded magnet by providing a commercially available Hall sensor IC having multiple Hall elements. FIG. 11, for example, illustrates an exemplary embodiment 1100 of a Hall sensor IC including first A and second B Hall element switches in close proximity to the same silicon substrate. The first switch may be configured to provide a digital "1" output when in proximity to a North magnetic state and a "−1" when in proximity to a South magnetic state. The second switch may be configured to provide a digital "−1" output when in proximity to a North magnetic state and a "1" when in proximity to a South magnetic state. Advantageously, the switches change state together without significant relative delay.

Figure 12:
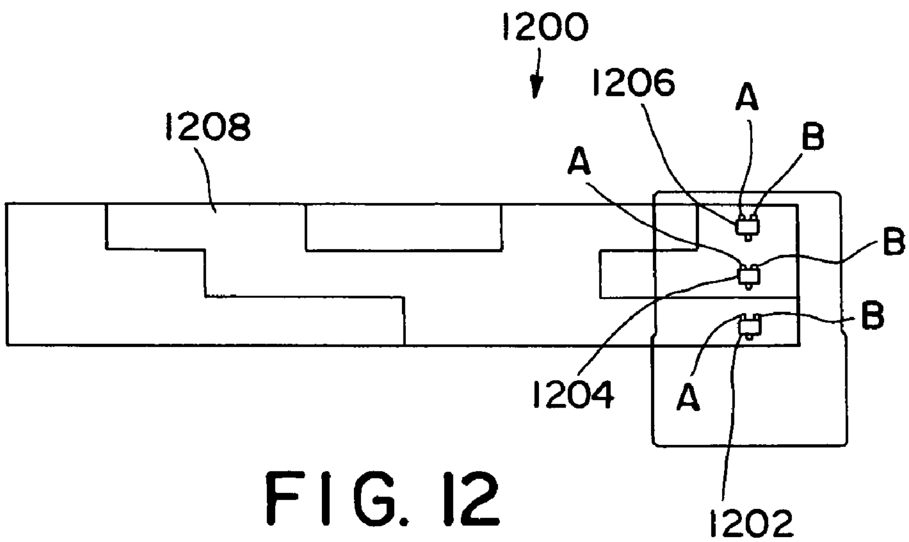
FIG. 12: diagrammatically illustrates a position of a magnet to a sensor array consistent with the invention containing Hall effect sensors as illustrated in FIG. 11.

FIG. 12 illustrates an exemplary system 1200 similar to that illustrated in FIG. 7, but including a magnet 1208 and Hall sensors 1202, 1204, 1206 having first and second switches. The Hall sensor outputs for the system 1200 for each of the eight positions are illustrated below in Table 5. In Table 5, the first switch for each sensor is labeled A and the second switch for each sensor is labeled B. The position illustrated in FIG. 12 corresponds to position 1 on Table 5.

TABLE 5

| | Hall 1202 | | Hall 1204 | | Hall 1206 | |
|---|---|---|---|---|---|---|
| Position | A | B | A | B | A | B |
| 1 | −1 | 1 | 1 | −1 | 1 | −1 |
| 2 | −1 | 1 | 1 | −1 | −1 | 1 |
| 3 | −1 | 1 | −1 | 1 | −1 | 1 |
| 4 | −1 | 1 | −1 | 1 | 1 | −1 |
| 5 | 1 | −1 | −1 | 1 | 1 | −1 |
| 6 | 1 | −1 | −1 | 1 | −1 | 1 |
| 7 | 1 | −1 | 1 | −1 | −1 | 1 |
| 8 | 1 | −1 | 1 | −1 | 1 | −1 |
| Error | 0 | 0 | 0 | 0 | 0 | 0 |

Redundancy is provided in this configuration since a logical combination of the outputs for each switch A,B on a sensor is required to determine the state of the sensor. In the event that a ferrous object interrupts the magnetic field, an error may occur indicating the interruption.

Figure 13:
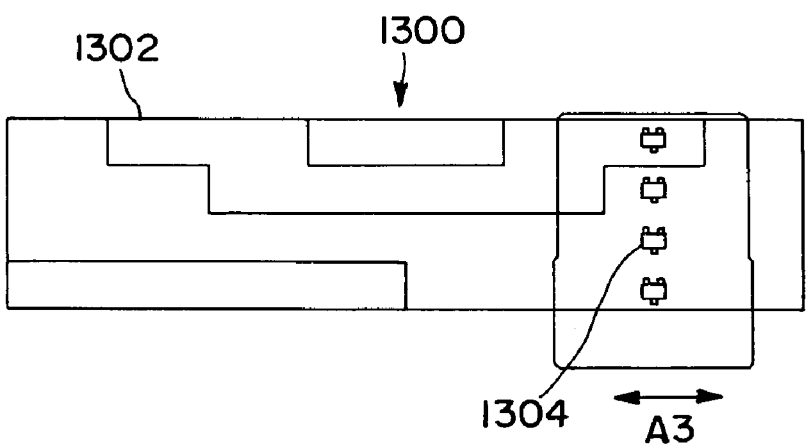
FIG. 13: diagrammatically illustrates a position of another magnet to another sensor array in containing Hall effect sensors wherein redundancy is provided consistent with the invention.

In a coded magnet configuration, redundancy may also be provided by providing an additional Hall sensor that is positioned in line with a uniformly magnetized portion of the magnet, i.e. the magnet has either a North or South magnetization state along the entire path proximate to the added sensor. FIG. 13 illustrates an exemplary embodiment 1300 providing redundancy in this manner. As shown, Hall sensor 1304 would provide a consistent output throughout its travel proximate to the magnet 1302 in the direction indicated by A3 since the magnetization state of the section proximate to the sensor does not change. As such, the Hall sensor 1304 may, for example, provide digital "1" output in all positions. A variance in the output of sensor 1304 from a digital "1" would indicate an interruption in the field, e.g. caused by a ferrous object inadvertently entering the location of the magnet and shunting the magnetic field away from the Hall sensors. The field interruption would result in a "no-field" situation or a "0" state which may be interpreted as an invalid state thereby signaling a fault.

Figure 14:
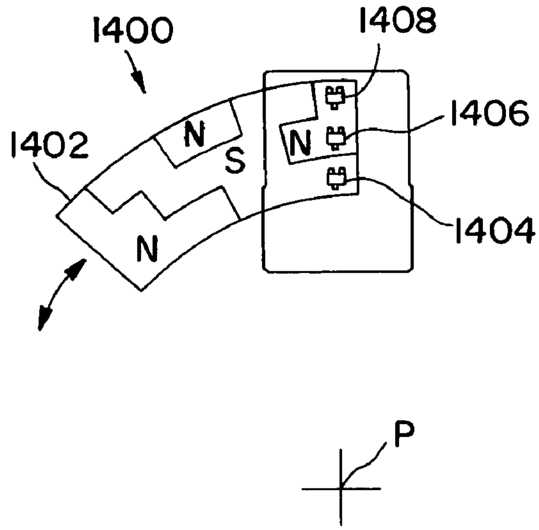
FIG. 14: diagrammatically illustrates a position of an arcuate magnet to a sensor array consistent with the invention.

In another embodiment 1400, as illustrated for example in FIG. 14, the coded magnet 1402 may be configured as an arc to facilitate sensing of rotational movement, i.e. angular position. The sensor portion of the system may, for example, be secured to a fixed component. The magnet 1402 may be secured to a rotationally movable element so that the magnet has an axis of rotation about a point P. The angular position of the magnet, and hence the movable element, is indicated by the outputs of the Hall devices 1404, 1406, 1408. Table 6 illustrates eight angular positions associated with the system 1400. The position of the Hall devices 1404, 1406, 1408 relative to the magnet in FIG. 14 corresponds to position 1 on Table 6.

TABLE 6

| Angular Position | Hall 1404 | Hall 1406 | Hall 1408 |
|---|---|---|---|
| 1 | 0 | 1 | 1 |
| 2 | 0 | 1 | 0 |
| 3 | 0 | 0 | 0 |
| 4 | 0 | 0 | 1 |
| 5 | 1 | 0 | 1 |
| 6 | 1 | 0 | 0 |
| 7 | 1 | 1 | 0 |
| 8 | 1 | 1 | 1 |

As with the linear sensor embodiments described above, the number of angular positions, i.e. the resolution, of the system 1400, may be modified by changing the magnetization states of the magnet and/or adding additional regions associated with additional Hall effect sensors. Also, configurations described above for providing redundancy can be applied to the system 1400.

Figure 15:
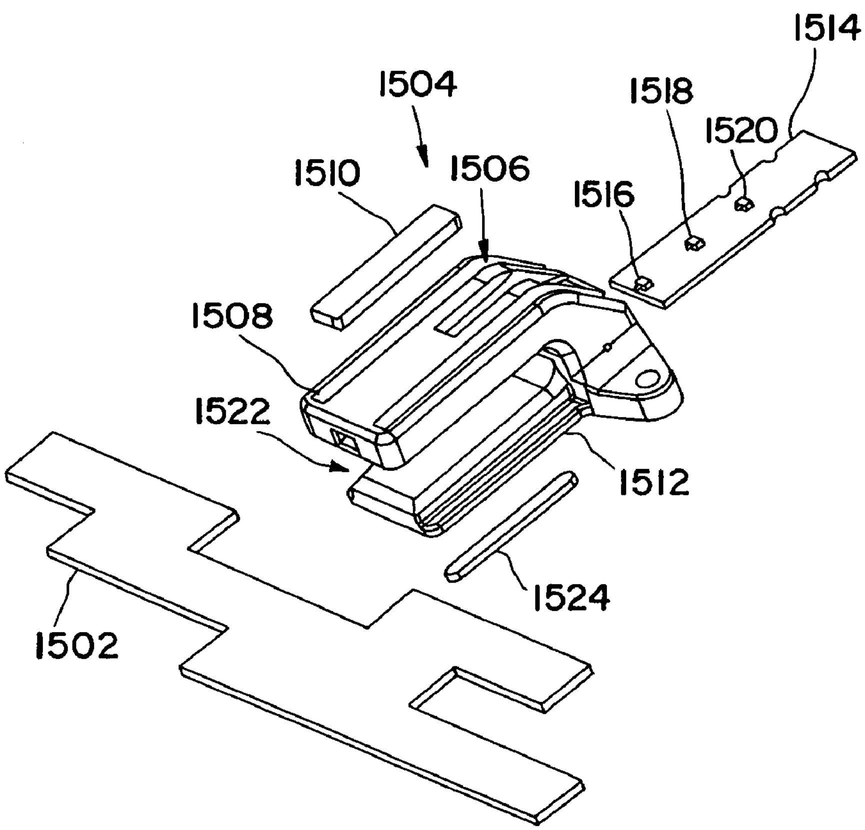
FIG. 15: is an exploded view of an exemplary U-shaped sensor system consistent with the invention.

Turning now to FIG. 15, there is illustrated another exemplary embodiment 1500 of a sensor system consistent with the invention. The illustrated system generally includes a shunt 1502 and a sensor assembly 1504. As shown also in the sectional view of FIG. 16, the sensor assembly may include a generally unshaped housing 1506. One leg 1508 of the U-shaped housing includes a magnet 1510, and an opposing leg 1512 of the U-shaped housing includes a circuit board 1514 with Hall sensors 1516, 1518, 1520 disposed thereon in a linear array. A passage 1522 for receiving the shunt 1502 is defined by the legs 1508, 1512 of the U-shaped housing.

In general, when the shunt 1502 or a portion thereof is present in the passage 1522 the magnetic field associated with the magnet 1510 is blocked so that it is not sensed by one or more of the Hall effect sensors 1516, 1518, 1520. However, when the shunt or a portion thereof is absent from the passage, the field associated with the magnet 1510 is sensed by one or more of the sensors. Thus, by mounting the housing and/or the shunt on a movable element, relative motion between the housing and the shunt may be sensed with a resolution based on the configuration of the shunt.

Figure 17:
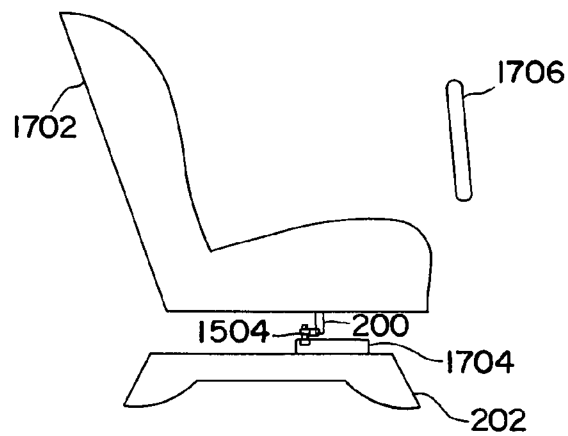
FIG. 17: illustrates a seat position sensing application consistent with the invention wherein a shunt is disposed in a passage defined by U-shaped sensor as illustrated in FIG. 15.
Figure 18:
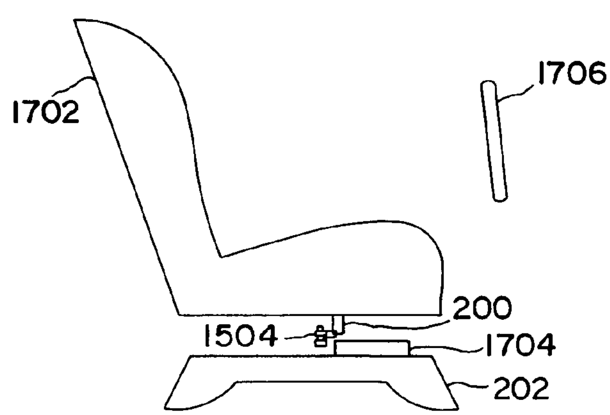
FIG. 18: illustrates a seat position sensing application consistent with the invention wherein a shunt is withdrawn from a passage defined by U-shaped sensor as illustrated in FIG. 15.

FIGS. 17–18, for example, illustrate a sensor assembly 1504 consistent with the invention in seat position sensing configuration. The seat position output provided by the U-shaped sensor assembly 1504 may be useful for controlling deployment of an airbag, in a seat position memory system, etc. In the illustrated embodiment, the sensor assembly 1504 is mounted on a rail 200 that moves with the vehicle seat 1702 relative to a stationary track 202. An opposing shunt 1704 is mounted to the track 202. In the illustrated exemplary embodiment, the shunt 1704 is of uniform height and of a predetermined length. The sensor assembly thus provides two position output control signals depending on the absence or presence of the shunt 1704 in the open passage of the sensor. The presence or absence of the shunt 1704 in the open passage of the sensor depends on the position of the seat 1702.

For instance, in the seat position configuration of FIG. 17, the seat 1702 has been moved sufficiently forward toward the steering wheel 1706 such that the passage of the moving sensor assembly 1504 accepts the shunt 1704. In this condition, the Hall sensors in the assembly 1504 do not sense a magnetic field and may provide, for example, digital "0" outputs.

In the seat position configuration of FIG. 18, however, the seat has been moved sufficiently rearward away from the steering wheel such the shunt 1704 is not disposed in the open passage of the sensor assembly 1504. Therefore, the Hall effect sensors sense a magnetic field and may provide, for example, digital "1" outputs. In one embodiment, the Hall sensor outputs may be used as control signals for controlling air bag deployment based on the position of the seat relative to the steering wheel. Of course, although the sensor 1504 includes three sensors, any number of Hall effect sensors may be used in the sensor assembly. In fact, in a system including a simple uniform shunt 1704, as shown, only one sensor is necessary to provide absolute sensing of two positions.

Figure 16:
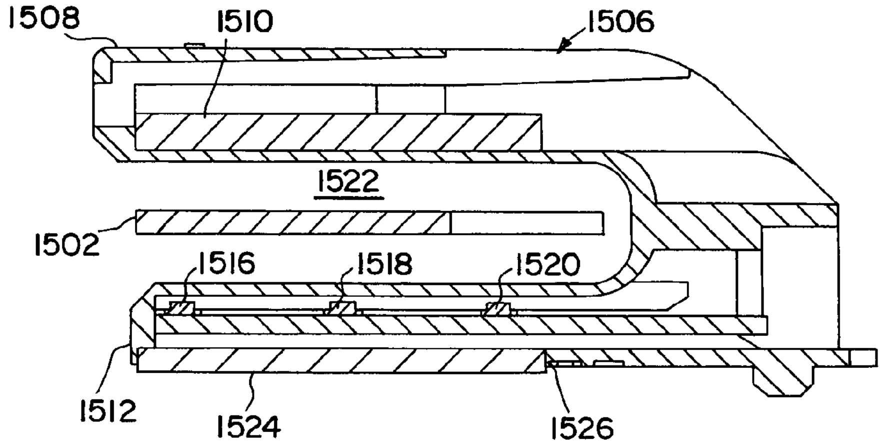
FIG. 16: is a sectional view of the sensor system illustrated in FIG. 15.
Figure 19A:
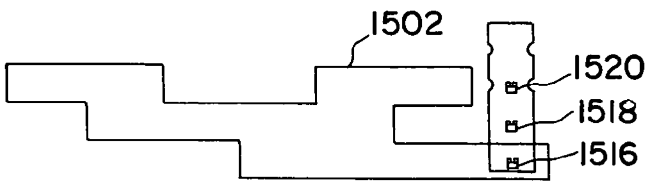
FIGS. 19A–19B: diagrammatically illustrate separate positions of the shunt to the sensor array in the system illustrated in FIG. 15.
Figure 19B:
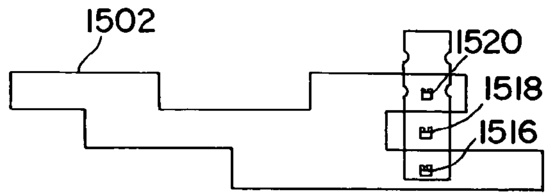

In the embodiment illustrated in FIGS. 15 and 16, three Hall effect sensors are provided on the circuit board in linear array, and the housing and shunt are mounted so that relative movement of the shunt to the housing is in a direction generally perpendicular to the linear array of sensors. The shape of the shunt is configured or "coded" to cause seven distinct position outputs from the combination of the three Hall sensors. For example, FIGS. 19A and 19B diagrammatically illustrate separate positions of the shunt 1502 relative to the Hall sensors 1516, 1518, 1520, and Table 7 below illustrates the Hall outputs for each of seven separate positions available in the illustrated exemplary embodiment. The position of the sensors illustrated in FIG. 19A corresponds to position 1 on Table 7, and the position of the sensors illustrated in FIG. 19B corresponds to position 2 on Table 7. As shown, in position 1 the first Hall effect sensor 1516 outputs a digital "0", while the other sensors output a digital "1." In position 2, only the second Hall effect sensor 1518 outputs a digital "1."

TABLE 7

| Position | Hall 1516 | Hall 1518 | Hall 1520 |
|---|---|---|---|
| 1 | 0 | 1 | 1 |
| 2 | 0 | 1 | 0 |
| 3 | 0 | 0 | 0 |
| 4 | 0 | 0 | 1 |
| 5 | 1 | 0 | 1 |
| 6 | 1 | 0 | 0 |
| 7 | 1 | 1 | 0 |

The Hall outputs thus identify the absolute position of the shunt 1502 relative to the housing. Those skilled in the art will recognize that the resolution of a system consistent with the invention, i.e. the number of sensed positions, will depend on the number of Hall sensors and the configuration of the shunt.

Figure 20:
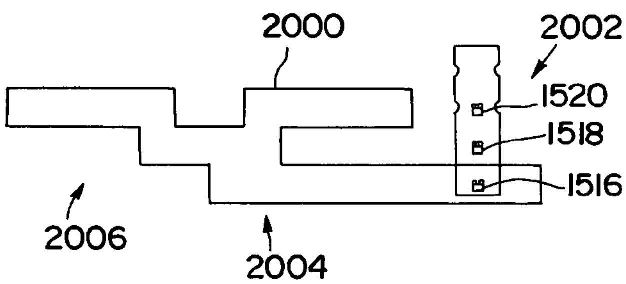
FIG. 20: diagrammatically illustrates a position of another shunt to the sensor array in the system illustrated in FIG. 15.
Figure 20A:
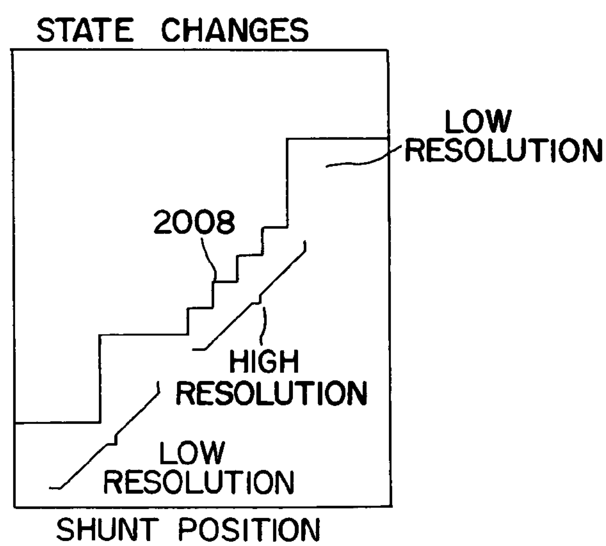
FIG. 20A: diagrammatically illustrates resolution of a system consistent with the invention relative to the length of a shunt as shown in FIG. 20.

Advantageously, the number and arrangement of the sensed positions may be modified to meet the requirements of a particular application by simply changing the configuration of the shunt and/or by modifying the number of sensors. FIG. 20, for example, diagrammatically illustrates another coded shunt configuration 2000 for providing seven distinct position outputs in connection with the sensor assembly 1504. In this embodiment, the shunt 2000 provides varying resolution along its length. FIG. 20A, for example, includes a plot 2008 diagrammatically illustrating Hall state changes (indicated by steps) vs. shunt position associated with movement of the sensors from a first end 2002 of the shunt to a second end 2006 of the shunt. Each state change represents an absolute position sensed by the system. As shown, the shunt 2000 provides a region of low resolution at each end 2002, 2006 thereof and a region of higher resolution in the middle section 2004 thereof. In particular, in the low resolution regions only two state changes occur, while in the high resolution region four state changes occur. This is accomplished by providing more frequent state changes in the middle section 2004. Those skilled in the art will recognize that redundancy may also be provided through configuration of the shunt and sensors in a manner similar to that described above in connection with the coded magnet configurations.

Figure 21:
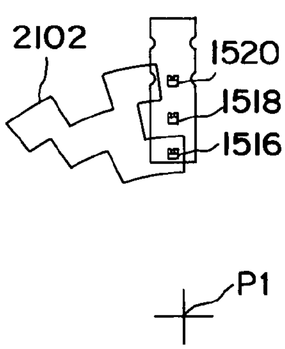
FIG. 21: diagrammatically illustrates a position of an arcuate shunt to the sensor array in the system illustrated in FIG. 15.

In another embodiment 2100, as illustrated for example in FIG. 21, the coded shunt may be configured as an arc 2102 to facilitate sensing of rotational movement, i.e. angular position. The sensor portion of the system may, for example, be secured to a fixed component. The shunt 2102 may be secured to a rotationally movable element so that it has an axis of rotation about a point P. The angular position of the shunt 2102, and hence the movable element, is indicated by the outputs of the Hall sensors 1516, 1518, 1520. Table 8 illustrates eight angular positions associated with the shunt 2102. The position of the sensors relative to the shunt in FIG. 21 corresponds to position 1 on Table 8.

TABLE 8

| Angular Position | Hall 1516 | Hall 1518 | Hall 1520 |
|---|---|---|---|
| 1 | 0 | 1 | 1 |
| 2 | 0 | 1 | 0 |
| 3 | 0 | 0 | 0 |
| 4 | 0 | 0 | 1 |
| 5 | 1 | 0 | 1 |
| 6 | 1 | 0 | 0 |
| 7 | 1 | 1 | 0 |

The number of angular positions, i.e. the resolution, may be modified by changing the shunt configuration and/ or adding additional regions associated with additional Hall effect sensors. Also, configurations described above for providing redundancy can be applied to the system a rotary embodiment.

Turning again to FIGS. 15 and 16, to protect against ferrous objects interrupting the field sensed by the Hall sensors the Hall sensors may optionally be pre-biased to reduce the magnetic field required to activate the sensors. In the illustrated exemplary embodiment, a pre-bias magnet 1524 that is relatively weak compared to the primary magnet 1510 is disposed in an associated slot 1526 in the housing 1506 beneath the board 1514 carrying the Hall sensors. This pre-biases the Hall sensors to turning on, thereby allowing use of a weaker primary magnet 1510 than would be otherwise be required. Use of a weaker primary magnet reduces 1510 the attraction of the magnet to ferrous objects, thereby reducing the likelihood that ferrous objects will interrupt the field to be sensed by the Hall sensors.

For example, in an embodiment without a pre-bias magnet 1524 a Hall effect sensor may require 100 Gauss to turn on at a given air gap. To reliably turn the sensor on, therefore, it may be necessary to provide a relatively strong primary magnet 1510 that will attract loose ferrous objects in the vicinity thereof. However, if a pre-bias magnet 1524 is used, the Hall sensor may require only 25 Gauss to turn on if 75 Gauss is consistently provided by the pre-bias magnet. As a result, a weaker primary magnet 1510 may be used, thereby reducing the possibility that ferrous objects will be attracted to the primary magnet.

Figure 8:
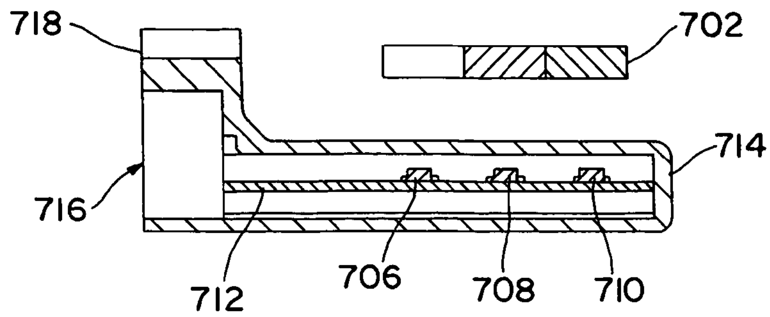
FIG. 8: is a sectional view of the sensor system illustrated in FIG. 7.
Figure 22:
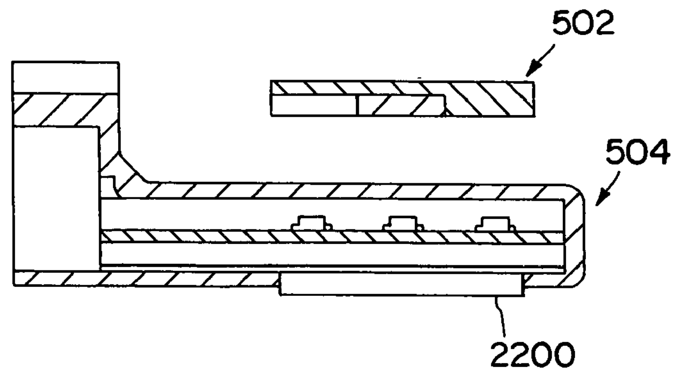
FIG. 22: is a sectional view of the system illustrated in FIG. 5 including a pre-bias magnet.

Those skilled in the art will recognize that pre-biasing may be applied to any embodiment of a sensor system consistent with the invention including Hall effect sensors by placing a pre-bias magnet in the vicinity of the sensors. For example, FIG. 22 illustrates a pre-bias magnet 2200 applied to pre-bias a linear array of Hall sensors used in a sensor assembly 504 as shown in FIG. 8. Those skilled in the art will also recognize that the pre-bias magnet may be provided in a variety of locations relative to the Hall sensors, e.g., above, below or adjacent to the Hall sensors. Also, separate pre-bias magnets may be provided for each of the Hall sensors to provide a separate bias to each sensor.

Figure 23:
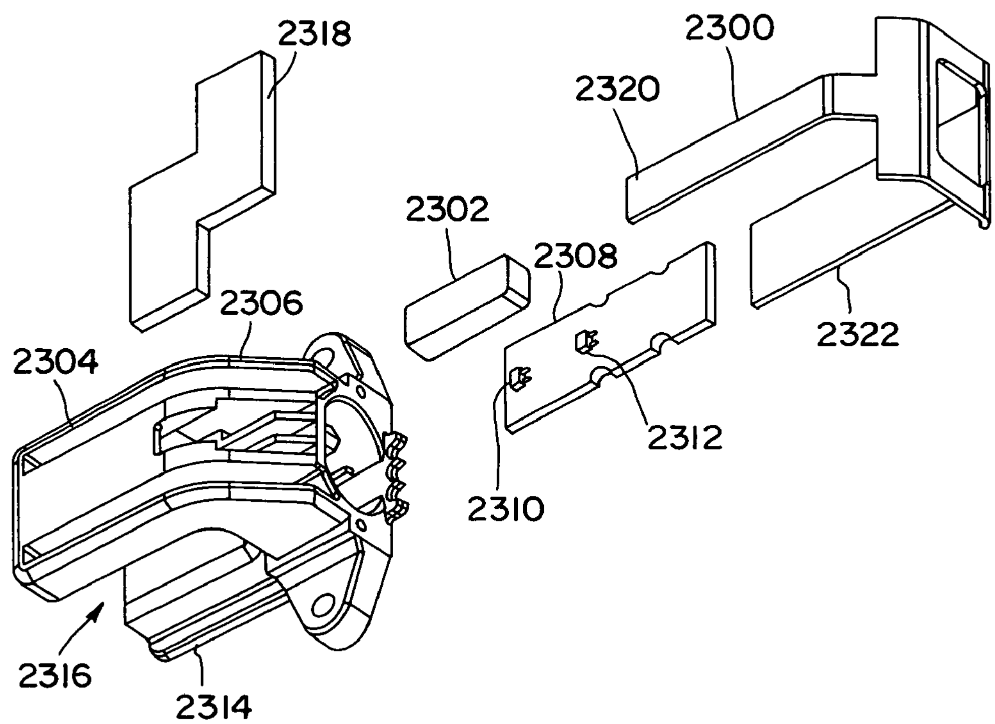
FIG. 23: is an exploded view of another exemplary U-shaped sensor system consistent with the invention including a concentrator.
Figure 24:
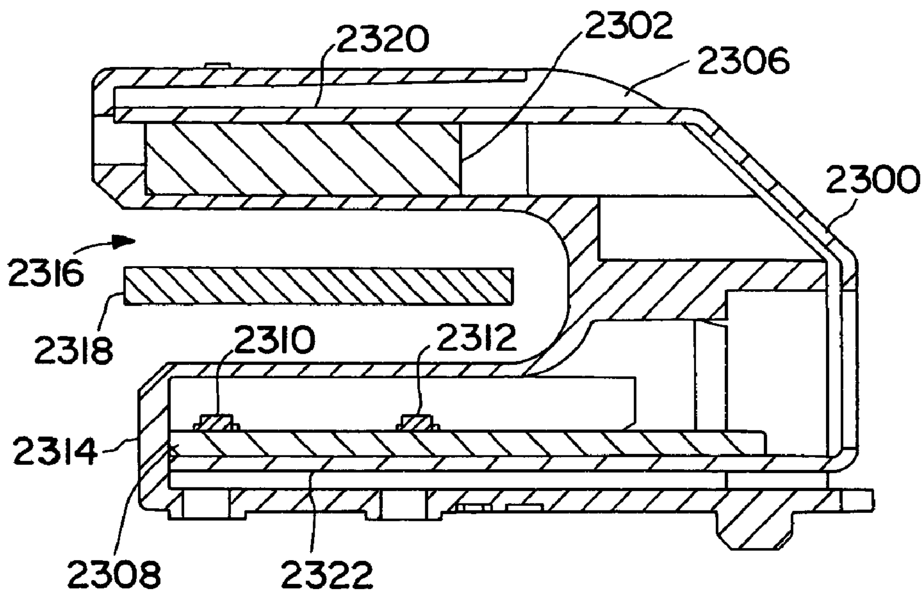
FIG. 24: is a sectional view of the sensor system illustrated in FIG. 23.

Turning to FIGS. 23 and 24, according to another aspect of the invention, primary magnet strength may also be reduced by providing a concentrator 2300 for closing the magnetic circuit. In the illustrated exemplary embodiment, a primary magnet 2302 is provided in one leg 2304 of a U-shaped housing 2306 and a circuit board 2308 with a linear array of Hall sensors 2310, 2312 disposed thereon is disposed in the other leg 2314. Again, the two legs of the U-shaped housing define a passage 2316 for receiving a shunt 2318. The illustrated concentrator 2300 is also U-shaped and has a first leg 2320 disposed against the back of the primary magnet 2302 and a second leg 2322 disposed against the bottom of the circuit board 2308 carrying the Hall sensors.

Figure 25:
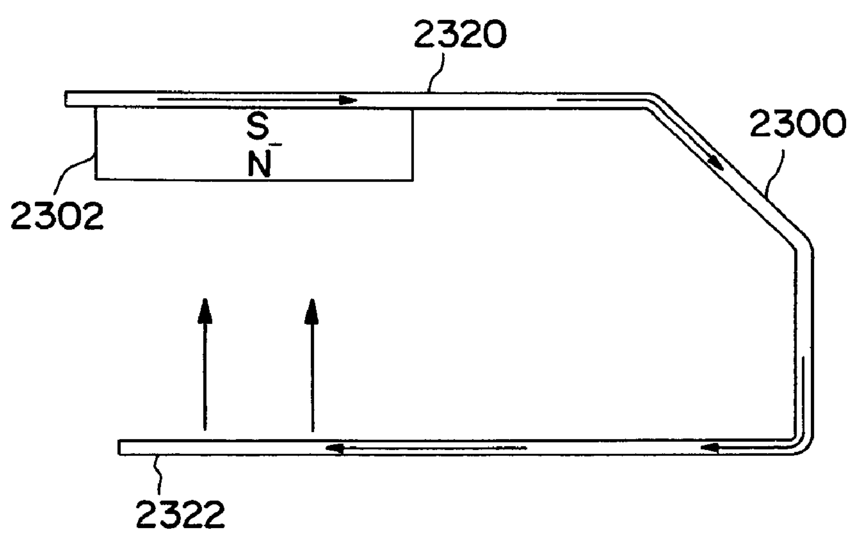
FIG. 25: diagrammatically illustrates a flux path associated with the concentrator illustrated in FIG. 23.

As illustrated in FIG. 25, the concentrator 2300 provides a flux path (indicated by arrows) for the magnetic flux generated by the primary magnet 2302. Closing the magnetic circuit in this manner allows use of a weaker primary magnet 2302 than would otherwise be required to turn the Hall sensors on at a given air gap. Providing a weaker primary magnet reduces the likelihood that ferrous objects will be attracted to the magnet thereby disrupting operation.

Figure 26:
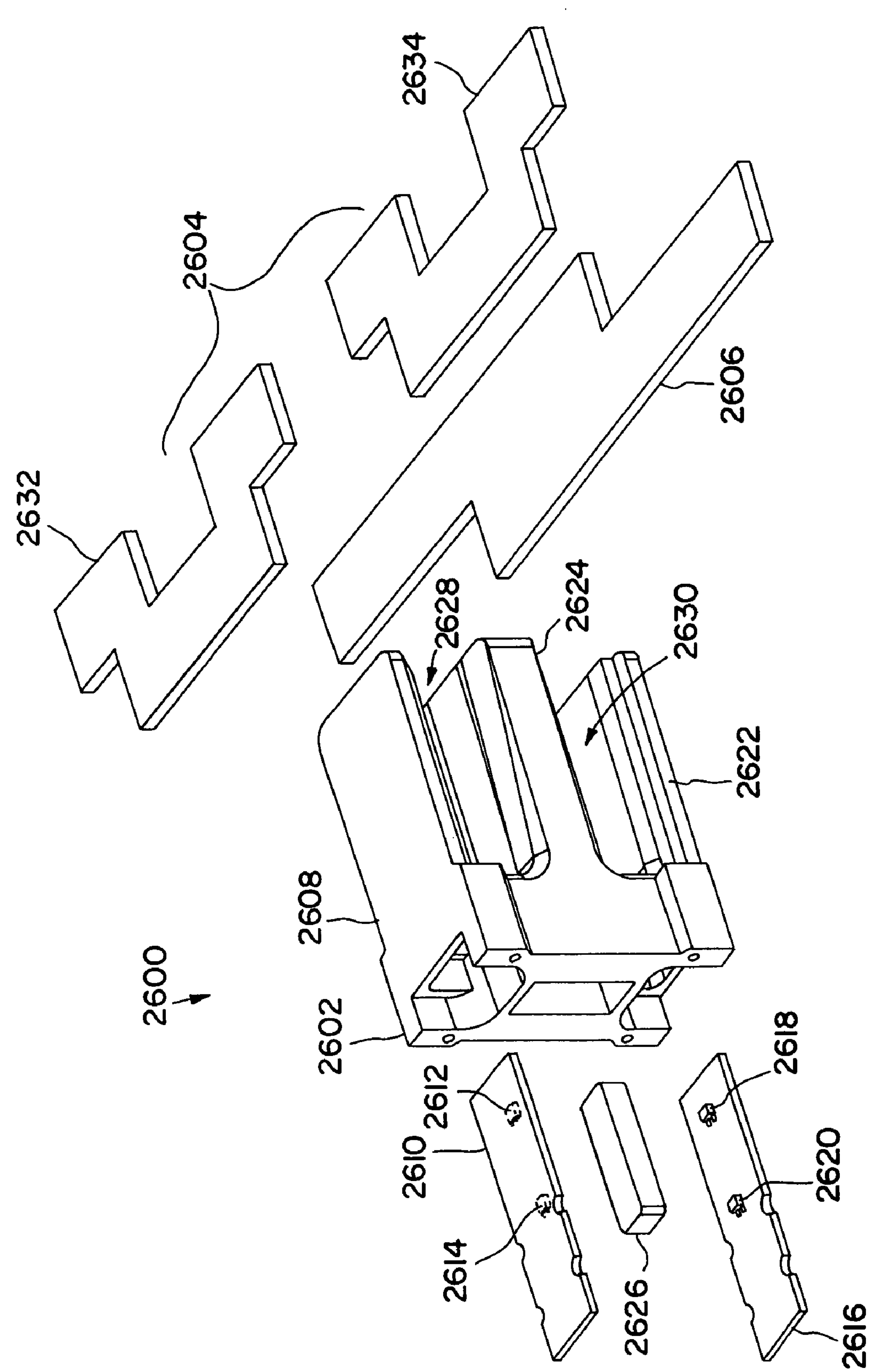
FIG. 26: is an exploded view of an exemplary W-shaped sensor system consistent with the invention.

FIGS. 26 and 27 illustrate another embodiment 2600 of a sensor system consistent with the invention. The system 2600 includes a generally W-shaped housing 2602 and first 2604 and second 2606 shunt configurations. The generally W-shaped housing includes a first leg 2608 in which is disposed a circuit board 2610 having first 2612 and second 2614 Hall sensors disposed thereon in a linear array. A second circuit board 2616 also having first 2618 and second 2620 Hall sensors is disposed in a second leg 2622 of the housing. The middle leg 2624 of the W-shaped housing includes a primary magnet 2626 disposed therein.

The space between the first leg 2608 and the middle leg 2624 defines a first passage 2628 for receiving the first sensor configuration 2604 and the space between the second leg 2622 and the middle leg 2624 defines a second passage 2630 for receiving the second sensor configuration 2606. The primary magnet 2626 is configured to turn all of the Hall sensors on when no shunt is disposed in the first and second passages. Thus, by mounting the housing and/or the shunts on a movable element, relative motion between the housing and one or both of the shunts may be sensed with a resolution based on the configurations of the shunts.

In the embodiment illustrated in FIGS. 26 and 27, two Hall effect sensors are provided on each circuit board in linear array, and the housing and shunts are mounted so that relative movement of the shunts to the housing is in a direction generally perpendicular to the linear arrays of sensors. The shunts are configured or "coded" to cause fifteen distinct position outputs from the combination of the four Hall sensors 2612, 2614, 2618, 2620. In the illustrated embodiment, the first shunt configuration 2604 includes first 2632 and second 2634 separate shunt portions that may be mounted adjacent to each other, whereas the second shunt portion 2606 is of a unitary construction.

FIG. 28A diagrammatically illustrates one position of the Hall sensors 2612 and 2614 to the shunt portions 2632, 2634 of the first shunt configuration 2604, and FIG. 28B diagrammatically illustrates the corresponding position of Hall sensors 2618, 2620 to the second shunt configuration 2606. Table 9 below illustrates the Hall outputs for each of fifteen separate positions available in the illustrated exemplary embodiment. The position illustrated in FIGS. 28A and 28B corresponds to position 4 on Table 9. As shown, in position 4 the Hall effect sensors 2612 and 2620 output a digital "0," while the other sensors output a digital "1."

TABLE 9

| Position | Hall 2618 | Hall 2620 | Hall 2612 | Hall 2614 |
|---|---|---|---|---|
| 1 | 1 | 1 | 1 | 1 |
| 2 | 0 | 1 | 1 | 1 |
| 3 | 1 | 0 | 1 | 1 |
| 4 | 1 | 0 | 0 | 1 |
| 5 | 0 | 0 | 0 | 1 |
| 6 | 0 | 1 | 0 | 1 |
| 7 | 1 | 1 | 0 | 1 |
| 8 | 1 | 1 | 0 | 0 |
| 9 | 0 | 1 | 0 | 0 |
| 10 | 0 | 0 | 0 | 0 |
| 11 | 1 | 0 | 0 | 0 |
| 12 | 1 | 0 | 1 | 0 |
| 13 | 0 | 0 | 1 | 0 |
| 14 | 0 | 1 | 1 | 0 |
| 15 | 1 | 1 | 1 | 0 |

The Hall outputs thus identify the absolute position of the shunts relative to the housing. Those skilled in the art will recognize that the resolution of a system consistent with the invention, i.e. the number of sensed positions, will depend on the number of Hall sensors and the configurations of the shunts. Redundancy may also be provided in the embodiment of FIG. 26, and rotational sensing may be achieved using arcuate shunt configurations.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. A non-contact position sensor comprising:

a plurality of sensor elements comprising Hall effect sensors configured in an array; each said sensor element configured to provide an output associated with each of a plurality of positions of a sensor control element, said sensor control element comprising a magnet, relative to said array of sensor elements, whereby a separate combination of said outputs is provided for each of said positions; and a biasing magnet mounted in a fixed position adjacent at least one of said sensor elements for biasing said at least one of said sensor elements to a selected output.

2. A sensor according to claim 1, wherein said sensor elements are configured in a linear array.

3. A sensor according to claim 2, wherein each said sensor element is configured to provide an associated output in response to movement of said sensor control element along said linear array to each of said plurality of positions.

4. A sensor according to claim 2, wherein each said sensor element is configured to provide an associated output in response to movement of said sensor control element across said array to each of said plurality of positions.

5. A sensor according to claim 1, wherein said sensor elements are configured in an arcuate array.

6. A sensor according to claim 1, wherein said magnet has a generally arcuate shape.

7. A sensor according to claim 6, wherein said array is a linear array.

8. A sensor according to claim 1, wherein said magnet has a length greater than a distance between adjacent ones of said Hall effect sensors.

9. A sensor according to claim 1, wherein at least one of said Hall effect sensors comprises first and second Hall elements; each of said Hall elements providing an associated output in response to a position of said sensor control element relative to said position sensor.

10. A sensor according to claim 1, wherein said magnet is a coded magnet comprising at least one North magnetized region and at least one South magnetized region.

11. A sensor according to claim 10, wherein said coded magnet comprises said at least one North magnetized region disposed adjacent said at least one South magnetized region.

12. A sensor according to claim 12, wherein said at least one North magnetized region and said at least one South magnetized region are configured to cause changes in said Hall effect sensor outputs at a first rate with movement of a first region of said magnet relative to said sensor and to cause changes in said Hall effect sensor outputs at a second rate greater than said first rate with movement of a second region of said magnet relative to said sensor.

* * * * *